(12) United States Patent
Johnson et al.

(10) Patent No.: US 9,896,373 B2
(45) Date of Patent: Feb. 20, 2018

(54) METHOD AND APPARATUS FOR LARGE FEATURE CREATION IN GLASS AND GLASS-CERAMIC ARTICLES

(71) Applicant: CORNING INCORPORATED, Corning, NY (US)

(72) Inventors: L. Urdenis Johnson, Tyrone, PA (US); Michael Albert Joseph, II, Corning, NY (US); Matthew John Towner, Campbell, NY (US); Kevin William Uhlig, Horseheads, NY (US)

(73) Assignee: Corning Incorporated, Corning, NY (US)

( * ) Notice: Subject to any disclaimer, the term of this patent is extended or adjusted under 35 U.S.C. 154(b) by 234 days.

(21) Appl. No.: 14/522,903

(22) Filed: Oct. 24, 2014

(65) Prior Publication Data
US 2015/0144676 A1    May 28, 2015

Related U.S. Application Data

(60) Provisional application No. 61/908,867, filed on Nov. 26, 2013.

(51) Int. Cl.
*C03B 33/04* (2006.01)
*C03B 33/03* (2006.01)
(Continued)

(52) U.S. Cl.
CPC ............ *C03B 33/04* (2013.01); *B65G 49/065* (2013.01); *C03B 33/03* (2013.01); *C03B 33/033* (2013.01);
(Continued)

(58) Field of Classification Search
CPC ............... Y10T 225/12; Y10T 225/321; Y10T 225/325; Y10T 225/304; B26F 3/002; B28D 5/0011
(Continued)

(56) References Cited

U.S. PATENT DOCUMENTS 2,880,553 A   4/1959 Carson
2,932,129 A   4/1960 Alexander et al.
(Continued)

FOREIGN PATENT DOCUMENTS

EP   0484836    5/1992
GB    764566   12/1956
(Continued)

OTHER PUBLICATIONS

Machine Translation JP1997278472.
(Continued)

*Primary Examiner* — Laura M Lee

(57) ABSTRACT

The disclosure provides a method for forming a hole in a glass or glass-ceramic sheets. The method includes scoring a major surface of a glass or glass-ceramic sheet to define the hole, placing the sheet on a cavity-containing receiving surface such that a peripheral edge of the cavity is positioned external to the area bounded by the first score, and fracturing the sheet along the score to break away the portion of the sheet defined by the first score. The method allows for the formation of large openings in thin glass sheets where the mother sheet is not broken or damaged by the formation of the opening.

14 Claims, 5 Drawing Sheets

(51) Int. Cl.
*B65G 49/06* (2006.01)
*C03B 33/033* (2006.01)

(52) U.S. Cl.
CPC .......... *Y10T 225/12* (2015.04); *Y10T 225/298* (2015.04); *Y10T 225/325* (2015.04)

(58) Field of Classification Search
USPC ............................... 225/2, 96, 96.5, 93.5, 94
See application file for complete search history.

(56) References Cited

U.S. PATENT DOCUMENTS

| | | | |
|---|---|---|---|
| 4,487,350 A | 12/1984 | DeTorre | |
| 4,497,477 A | 2/1985 | Abel | |
| 6,829,910 B1 | 12/2004 | Hsieh et al. | |
| 7,441,680 B2 * | 10/2008 | Luettgens | B28D 1/00 225/2 |
| 8,518,280 B2 | 8/2013 | Hsu et al. | |
| 2002/0108260 A1 * | 8/2002 | Gartner | B28D 1/30 33/18.1 |
| 2003/0051353 A1 * | 3/2003 | Gartner | B28D 1/30 33/18.1 |
| 2009/0022558 A1 | 1/2009 | Bando | |
| 2014/0131413 A1 * | 5/2014 | Mader | B28D 5/0011 225/2 |

FOREIGN PATENT DOCUMENTS

| | | |
|---|---|---|
| GB | 829466 | 3/1960 |
| GB | 1523368 | 8/1978 |
| GB | 2152922 | 8/1985 |
| JP | 08277137 A | 10/1996 |
| JP | 1997278472 | 10/1997 |
| JP | 2001-2438 | 1/2001 |
| JP | 2006273614 A | 10/2006 |
| JP | 2012031018 A | 2/2012 |
| WO | 2010-002446 | 1/2010 |

OTHER PUBLICATIONS

Machine Translation JP2001-2438.
PCT/US2014/065609 Search Report.
English Translation of JP2016533119 Office Action dated May 30, 2017; 7 pages; Japanese Patent Office.

* cited by examiner

METHOD AND APPARATUS FOR LARGE FEATURE CREATION IN GLASS AND GLASS-CERAMIC ARTICLES

CROSS-REFERENCE TO RELATED APPLICATIONS

This application claims the benefit of priority under 35 U.S.C. § 119 of U.S. Provisional Application Ser. No. 61/908,867 filed on Nov. 26, 2013, the entire content of which is hereby incorporated by reference.

BACKGROUND

Field

The present disclosure relates generally to methods and apparatus for forming holes in glass or glass-ceramic sheets, and more specifically to patterning methods and related apparatus where both the glass or glass-ceramic sheet and the cut-out remain intact.

Technical Background

Holes can be punched or drilled through glass and glass-ceramic sheets using high velocity drills. Such approaches can damage the glass sheet, however, particularly at the peripheral edge of the hole at the opposite face from where the glass is penetrated. Further, drilling methods typically sacrifice the cut-out portion to waste.

It would be advantageous to provide apparatus and methods for forming large cut-out features in glass substrates without damaging either the mother sheet or the cut-out portion.

BRIEF SUMMARY

In accordance with embodiments of the present disclosure, a method for forming a hole in a glass or a glass-ceramic sheet comprises making a first score in a major surface of the sheet to define the hole, placing the sheet on a receiving surface of a mount having a cavity formed in the receiving surface such that a peripheral edge of the cavity is positioned external to the area bounded by the first score, and fracturing the glass or glass-ceramic along the first score to break away the portion of the sheet defined by the first score. After placing the sheet on the receiving surface, a portion of the sheet contacts a compressible member located within the cavity. After fracturing the sheet, the broken away portion of the sheet is supported within the cavity by the compressible member.

The apparatus for forming the hole comprises a mount having a receiving surface, a cavity formed in the receiving surface, and a compressible member disposed at least at a peripheral edge of the cavity. During use of the apparatus, the compressible member is compressed to a first extent by a glass or a glass-ceramic sheet mounted on the receiving surface, and the compressible member is compressed to a second extent greater than the first extent by a cut-away portion of the sheet after the sheet is fractured along the score.

Additional features and advantages of the subject matter of the present disclosure will be set forth in the detailed description which follows, and in part will be readily apparent to those skilled in the art from that description or recognized by practicing the subject matter of the present disclosure as described herein, including the detailed description which follows, the claims, as well as the appended drawings.

It is to be understood that both the foregoing general description and the following detailed description present embodiments of the subject matter of the present disclosure, and are intended to provide an overview or framework for understanding the nature and character of the subject matter of the present disclosure as it is claimed. The accompanying drawings are included to provide a further understanding of the subject matter of the present disclosure, and are incorporated into and constitute a part of this specification. The drawings illustrate various embodiments of the subject matter of the present disclosure and together with the description serve to explain the principles and operations of the subject matter of the present disclosure. Additionally, the drawings and descriptions are meant to be merely illustrative, and are not intended to limit the scope of the claims in any manner.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1A:
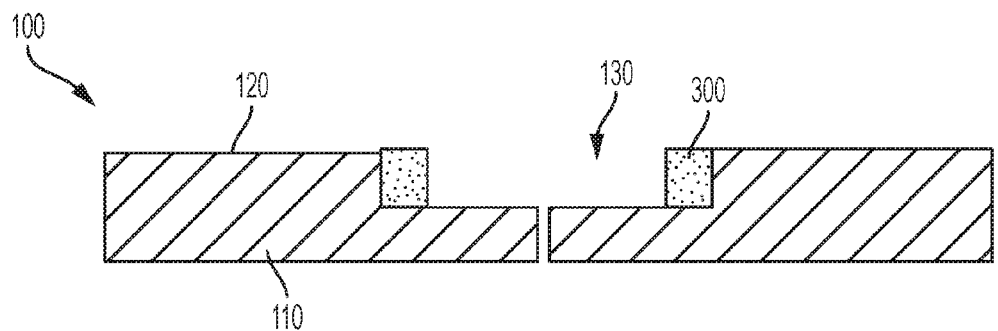
FIGS. 1A-1C are schematic diagrams of an apparatus for forming large features in glass and glass-ceramic sheets according to embodiments.

Reference will now be made in greater detail to various embodiments of the subject matter of the present disclosure, some embodiments of which are illustrated in the accompanying drawings. The same reference numerals will be used throughout the drawings to refer to the same or similar parts.

Figure 1B:
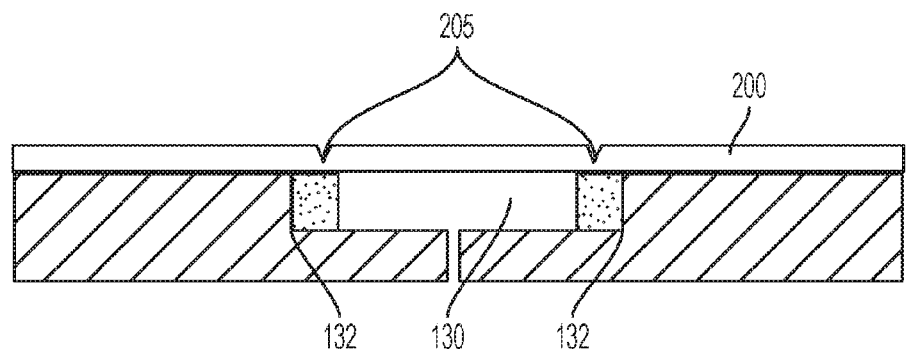
Figure 1C:
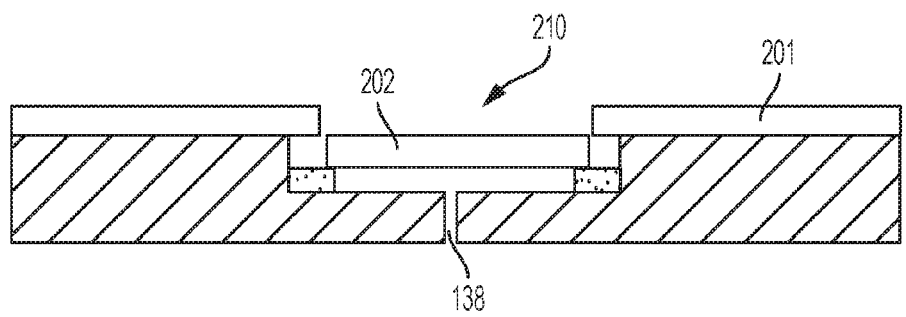

Referring to FIGS. 1A-1C, an apparatus 100 for forming a hole (e.g., aperture) 210 in a glass or glass-ceramic sheet 200 includes a mount 110 having a receiving surface 120 and a depressed region such as a cavity 130 located in the receiving surface 120. As illustrated in FIG. 1B, a glass or glass-ceramic sheet 200 provided with a score 205 defining a hole 210 to be formed in the sheet 200 is placed on the receiving surface 120 such that a peripheral edge 132 of the cavity 130 is positioned external to the area bounded by the score 205. The application of force to the area bounded by the score 205 induces propagation of the score though the thickness of the sheet 200 to form a patterned (e.g., apertured) sheet 201 and a cut-away portion 202. In an example apparatus, the receiving surface supports the sheet during the act of fracturing and the cavity is configured to retain the cut-away portion.

As used herein, a "score" is a notch formed in a surface of a glass sheet. A score may be formed using a scribe or a wheel, for example, such as a diamond-tipped or carbide scribe. Prior to fracture, a glass or glass-ceramic sheet may be scored to an average depth of 1-1000 microns (e.g., 1, 2, 5, 10, 20, 50, 100, 200, 500 or 1000 microns) to define the hole to be formed. The score may be a closed score or an open score. A closed score circles back on itself to define a hole that is entirely framed by the sheet. An open score terminates at an edge of the sheet to define a hole that is partially framed by the sheet.

The "mother sheet" as used herein refers to an apertured sheet of glass or glass-ceramic. The "cut-away portion" refers to the section or piece of glass or glass-ceramic that is removed from the sheet to form the hole.

The mount 110 may be formed from a rigid material. For example, the mount may be machined from metal such as aluminum. The mount includes a receiving surface 120, i.e., a glass sheet receiving surface or a glass-ceramic sheet receiving surface. The receiving surface 120 is configured to contact a major surface of the glass or glass-ceramic sheet to be patterned. The sheet may be planar or non-planar, and thus the receiving surface may be planar or non-planar.

A cavity 130 is formed in the receiving surface of the mount. The cavity has areal dimensions that are larger than those associated with the hole or pattern to be formed in the glass or glass-ceramic sheet. In embodiments, during a method of forming a hole in a glass or glass-ceramic sheet, a peripheral edge 132 of the cavity 130 is positioned external to the area bounded by a score in the sheet. In embodiments, the cavity has a depth (measured with respect to the receiving surface) greater than or equal to the thickness of the sheet.

In embodiments, a compressible member 300 is disposed at least at a peripheral edge of the cavity. Prior to fracture of the sheet, the compressible member may substantially fill the cavity. In a mount comprising a circular cavity, for example, the compressible member may be shaped as a circular prism having an outer diameter that is less than the inner diameter of the cavity. In further embodiments, the compressible member 300 may be in the shape of a torus (i.e., an O-ring). Such a torus has an outer diameter less than the inner diameter of the cavity. As shown, for example, in FIG. 1A, the compressible member has a height that is greater than the depth of the cavity such that at least a portion of the compressible member extends above the receiving surface.

The compressible member 300 is configured to contact the glass or glass-ceramic sheet 200 while the un-patterned sheet is supported by the receiving surface 120. During a method of forming a hole 210 in a glass or glass-ceramic sheet, the sheet is initially placed on the receiving surface and the compressible member is compressed within the cavity to a first extent (see FIG. 1B).

In one embodiment, the compressible member has areal dimensions that are smaller than those of the cavity, but larger than those defined by the score.

Without wishing to be bound by theory, the compressible member can support the cut-out portion of the sheet during the act of fracturing the sheet and can ensure that the sheet breaks uniformly without chipping or fragmenting. After fracturing of the sheet, the compressible member is compressed within the cavity to a second extent greater than the first extent (see FIG. 1C). The compressible member may be formed from a polymer material such as foam, for example.

During the act of fracturing, the mother sheet can be secured to the mount. In particular, the mother sheet is secured to the receiving surface so as to maintain contact between the sheet and the receiving surface during the fracturing, while the cut-away portion is unsecured. In embodiments, the sheet is fractured only along the first score.

In embodiments, a hole is formed in the glass or glass-ceramic sheet without physically making contact with the cut-out portion. For example, after placing the scored sheet on the mount, vacuum can be pulled within the cavity to induce a pressure gradient across the sheet proximate to the first score. The pressure gradient creates a force that induces fracture along the score line. The fracture advances substantially perpendicular to the major surfaces of the glass sheet to define a hole within the mother sheet of glass. A constant or variable vacuum pressure can be used. Vacuum can be pulled within cavity 130 via aperture 138 formed in the mount. In embodiments, reduced pressure within the cavity creates deformation (strain) of the glass or glass-ceramic sheet in the region of the hole.

In embodiments, such as when only one major surface of the sheet is scored, the sheet is placed on the receiving surface with the scored major surface facing away from (not in contact with) the receiving surface or the compressible member. The sheet may be scored before placing the sheet on the receiving surface or after placing the sheet on the receiving surface. Optionally, a second score can be formed in a major surface of the sheet opposite to the first score.

Optionally, a temperature gradient can be applied to the sheet either by heating or cooling to create stresses that promote fracture. For instance, after scoring, the scored side of the sheet can be locally cooled in the region of the cut-away, which can be separated from the mother sheet, for example, using a suction cup.

Figure 2:
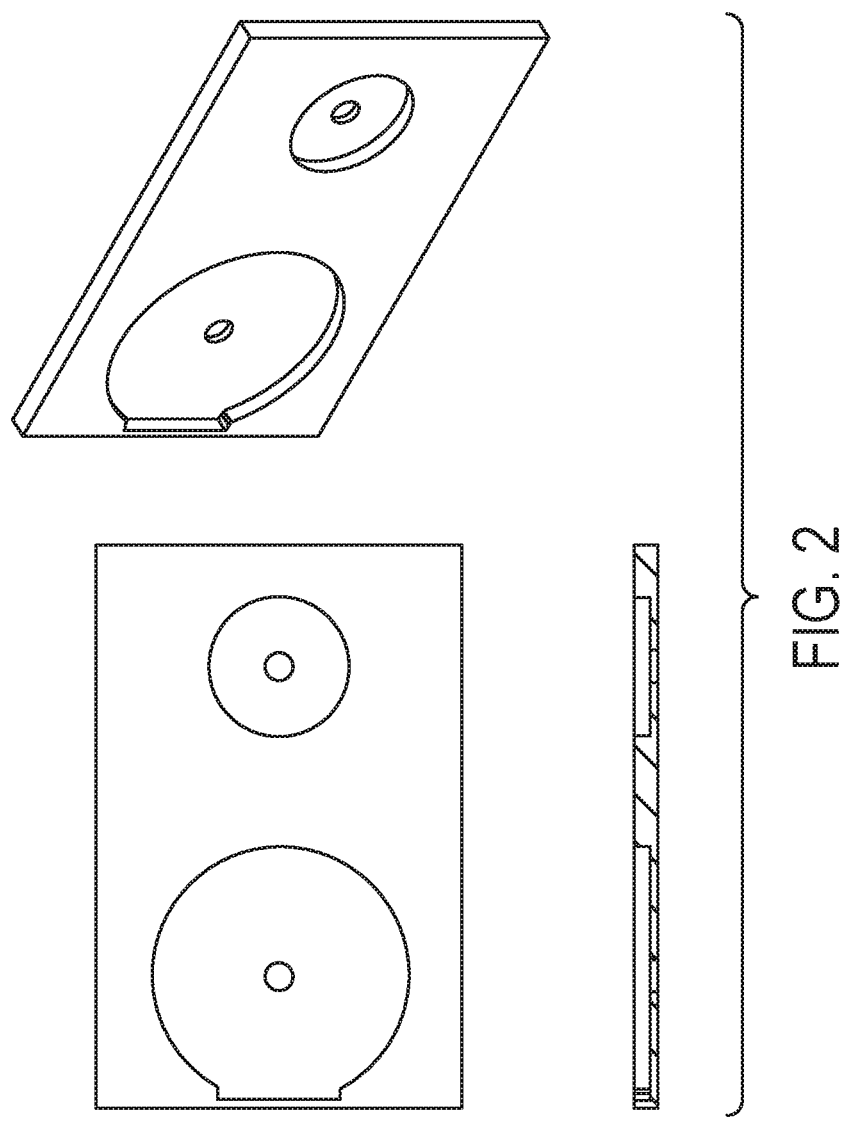
FIG. 2 is an engineering drawing of an apparatus for forming large features in glass and glass-ceramic sheets according to embodiments.
Figure 3:
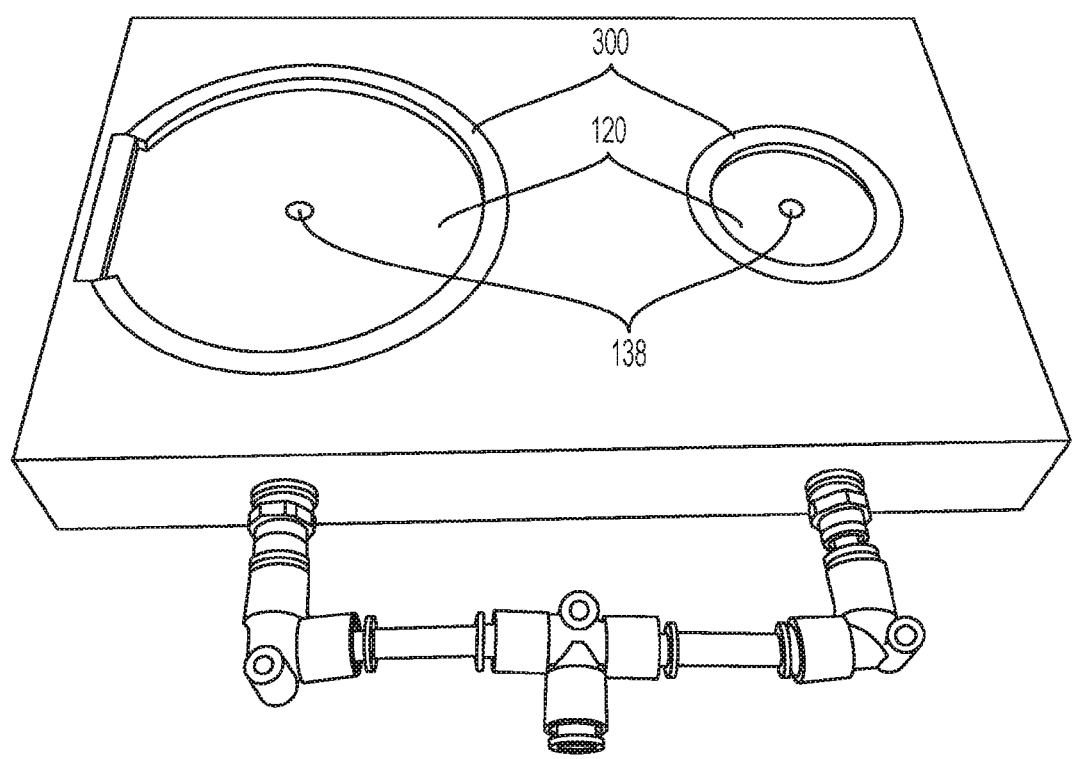
FIG. 3 is a photograph of the apparatus of FIG. 2.

An engineering drawing and accompanying diagram of an example apparatus are shown in FIG. 2. A photograph of an example apparatus is shown in FIG. 3.

The disclosed apparatus and method can be used to form a variety of feature shapes and sizes in a sheet of glass or glass-ceramic. The cut-away shape can be circular or oval, for example. Feature sizes (measured in terms of a characteristic length such as a diameter or edge length) can range from 1 mm to 100 mm (e.g., 1, 2, 5, 10, 20, 50 or 100 mm). A single hole or plural holes may be formed in a glasses or glass-ceramic sheet.

Example glasses and glass-ceramics that can be fractured and patterned using the disclosed apparatus and methods include un-tempered glass sheets and ion-exchanged glass sheets. A sheet thickness can range from 50 microns to 2 mm, e.g., 50, 100, 200, 500, 1000, 1500 or 2000 microns, including ranges between any of the foregoing values.

Figure 4:
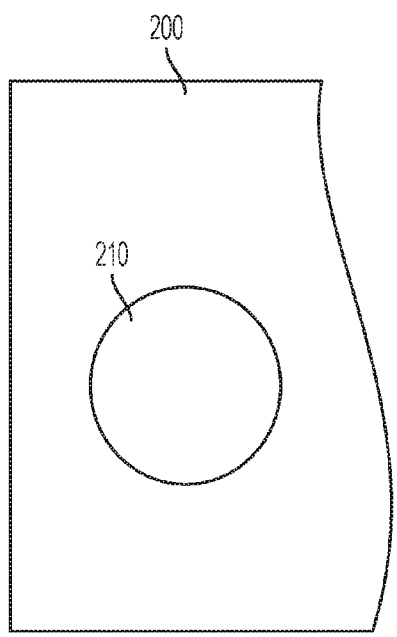
FIG. 4 is a schematic of a glass sheet patterned using a closed score.
Figure 5:
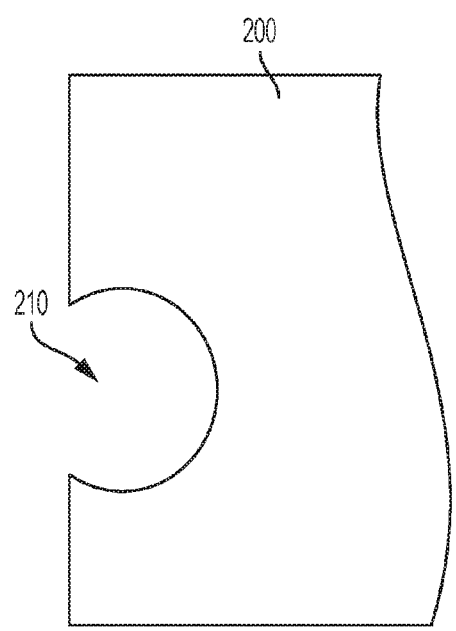
FIG. 5 is a schematic of a glass sheet patterned using an open score.
Figure 6:
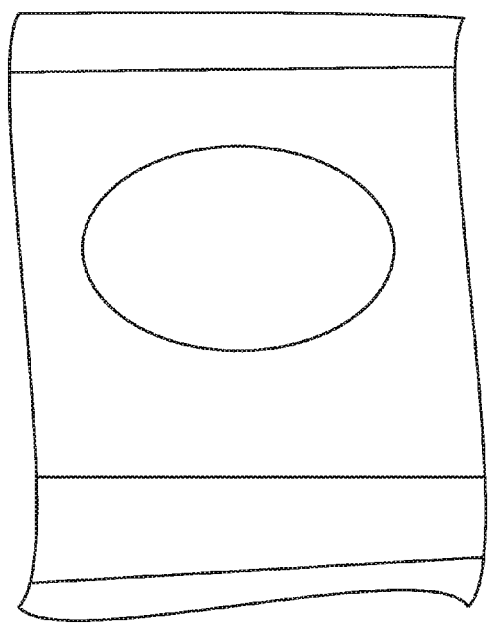
FIG. 6 is an optical micrograph of a glass sheet patterned using a closed score.
Figure 7:
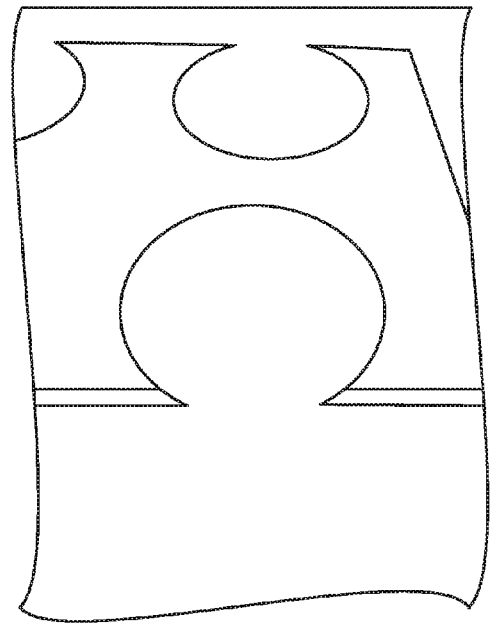
FIG. 7 is an optical micrograph of a glass sheet patterned using an open score.

A schematic of a glass or glass-ceramic sheet comprising a closed hole 210 is shown in FIG. 4. A schematic of a glass or glass-ceramic sheet comprising an open hole 210 is shown in FIG. 5. Respective photographs of a glass sheet having a closed hole and open holes are shown in FIGS. 6 and 7.

In contrast to water jetting and laser drilling methods, for example, the disclosed methods and apparatus can be used to reliably and economically form holes, including large sized holes, in glass substrates.

As used herein, the singular forms "a," "an" and "the" include plural referents unless the context clearly dictates otherwise. Thus, for example, reference to a "cut out" includes examples having two or more such "cut outs" unless the context clearly indicates otherwise.

Ranges can be expressed herein as from "about" one particular value, and/or to "about" another particular value. When such a range is expressed, examples include from the one particular value and/or to the other particular value.

Similarly, when values are expressed as approximations, by use of the antecedent "about," it will be understood that the particular value forms another aspect. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order. Accordingly, where a method claim does not actually recite an order to be followed by its steps or it is not otherwise specifically stated in the claims or descriptions that the steps are to be limited to a specific order, it is no way intended that any particular order be inferred. Any recited single or multiple feature or aspect in any one claim can be combined or permuted with any other recited feature or aspect in any other claim or claims.

It is also noted that recitations herein refer to a component being "configured" or "adapted to" function in a particular way. In this respect, such a component is "configured" or "adapted to" embody a particular property, or function in a particular manner, where such recitations are structural recitations as opposed to recitations of intended use. More specifically, the references herein to the manner in which a component is "configured" or "adapted to" denotes an existing physical condition of the component and, as such, is to be taken as a definite recitation of the structural characteristics of the component.

While various features, elements or steps of particular embodiments may be disclosed using the transitional phrase "comprising," it is to be understood that alternative embodiments, including those that may be described using the transitional phrases "consisting" or "consisting essentially of," are implied. Thus, for example, implied alternative embodiments to a compressible member comprising a compressible material include embodiments where a compressible member consists of a compressible material and embodiments where a compressible member consists essentially of a compressible material.

It will be apparent to those skilled in the art that various modifications and variations can be made to the present invention without departing from the spirit and scope of the invention. Since modifications, combinations, sub-combinations and variations of the disclosed embodiments incorporating the spirit and substance of the invention may occur to persons skilled in the art, the invention should be construed to include everything within the scope of the appended claims and their equivalents.

We claim:

1. A method for forming a hole in a glass or glass-ceramic sheet including a first surface, a second surface, and a thickness of 2 mm or less, comprising:

making a first score in the first surface of the glass or glass-ceramic sheet, the first score defining an edge of the hole;

placing the glass or glass-ceramic sheet on a receiving surface of a mount having a cavity formed in the receiving surface, the cavity comprising a peripheral edge and a depth, and containing a compressible member that contacts the second surface of the glass or glass ceramic sheet in an area opposite the first score, the peripheral edge of the cavity sized such that it is positioned external to the area bounded by the first score, and the glass or glass-ceramic sheet positioned such that the first score is opposite the receiving surface; and fracturing the glass or glass-ceramic sheet along the first score to break away a broken away portion of the glass or glass-ceramic sheet defined by the first score, wherein the broken away portion is contained within the cavity, wherein the first score is made before placing the glass or glass-ceramic sheet on the receiving surface; and wherein the compressible member is compressed to a first extent by the glass or glass-ceramic sheet on the receiving surface and is compressed to a second extent greater than the first extent by the broken away portion such that the broken away portion is supported within the cavity by the compressible member after the glass or glass-ceramic sheet is fractured.

2. The method according to claim 1, further comprising making a second score in a second surface of the sheet opposite to the first score.

3. The method according to claim 1, wherein the sheet is fractured only along the first score.

4. The method according to claim 1, wherein the sheet is fractured by applying a vacuum to the cavity after placing the sheet.

5. The method according to claim 1, wherein the sheet is fractured by applying a variable vacuum pressure to the cavity after placing the sheet.

6. The method according to claim 1, comprising applying a temperature gradient to the sheet across the first score.

7. The method according to claim 1, wherein the sheet is secured to the receiving surface.

8. The method according to claim 1, wherein the first score is a closed score.

9. The method according to claim 1, wherein the first score is an open score.

10. The method of claim 1, wherein the compressible member is disposed at least at a peripheral edge of the cavity.

11. The method of claim 1, wherein the compressible member has a height that is greater than the depth of the cavity.

12. The method of claim 1, wherein the compressible member comprises a polymer.

13. The method of claim 1, wherein the thickness of the glass or glass-ceramic sheet is from 50 µm to 2 mm.

14. The method of claim 1, wherein the diameter of the hole is from 1 mm to 100 mm.

* * * * *